US007558884B2

(12) United States Patent
Fuller et al.

(10) Patent No.: US 7,558,884 B2
(45) Date of Patent: Jul. 7, 2009

(54) PROCESSING INFORMATION RECEIVED AT AN AUXILIARY COMPUTING DEVICE

(75) Inventors: Andrew J. Fuller, Redmond, WA (US); Matthew P. Rhoten, Seattle, WA (US); Christopher A. Schoppa, Redmond, WA (US); Curt A. Steeb, Redmond, WA (US); Juan Perez, Seattle, WA (US); Seiya Ohta, Issaquah, WA (US); Niels van Dongen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 608 days.

(21) Appl. No.: 10/837,895

(22) Filed: May 3, 2004

(65) Prior Publication Data

US 2005/0262302 A1    Nov. 24, 2005

(51) Int. Cl.
*G06F 15/16* (2006.01)
(52) U.S. Cl. .................. 709/248; 709/209; 709/224; 713/324; 345/1.3; 711/113
(58) Field of Classification Search ................ 709/203, 709/206, 224, 248, 208, 209; 455/566; 713/300, 713/320, 324; 345/1.2, 1.3; 711/113
See application file for complete search history.

(56) References Cited

U.S. PATENT DOCUMENTS

| 4,004,277 | A | * | 1/1977 | Gavril ......................... 710/23 |
| 5,363,502 | A | * | 11/1994 | Kagimasa et al. .............. 714/6 |
| 5,649,023 | A | | 7/1997 | Barbara |
| 5,745,105 | A | | 4/1998 | Kim |
| 5,825,336 | A | | 10/1998 | Fujita |
| 5,910,799 | A | | 6/1999 | Carpenter |
| 5,960,214 | A | | 9/1999 | Sharpe |
| 6,035,339 | A | | 3/2000 | Agraharam |
| 6,096,096 | A | | 8/2000 | Murphy et al. ................ 717/11 |
| 6,191,758 | B1 | * | 2/2001 | Lee ............................ 345/2.2 |
| 6,268,837 | B1 | | 7/2001 | Kobayashi |
| 6,281,893 | B1 | | 8/2001 | Goldstein |
| 6,327,482 | B1 | * | 12/2001 | Miyashita .................... 455/566 |
| 6,370,629 | B1 | | 4/2002 | Hastings |

(Continued)

FOREIGN PATENT DOCUMENTS

WO    WO01/75684    10/2001

OTHER PUBLICATIONS

Office Action dated May 21, 2008 cited in related U.S. Appl. No. 10/838,174 (Copy Attached).

(Continued)

*Primary Examiner*—Oanh Duong
(74) *Attorney, Agent, or Firm*—Workman Nydegger

(57) ABSTRACT

Described is a mechanism for receiving new data at an auxiliary device associated with a main computer system, and processing that new data within the auxiliary device firmware to take some action. The receipt and processing of the data is independent of whether the main computer system is in a powered-up state (online) or powered-down state (offline). A cache that maintains the user application data for offline navigation may be updated with new data, either to change existing data in the cache or add a new navigation path. The received data can be processed to perform other actions, depending on the context of that data as determined by auxiliary processing.

22 Claims, 13 Drawing Sheets

U.S. PATENT DOCUMENTS

| | | | |
|---|---|---|---|
| 6,384,801 B1 | 5/2002 | Takahashi | |
| 6,415,418 B1 * | 7/2002 | McLaughlin et al. | 716/3 |
| 6,438,577 B1 | 8/2002 | Owens | |
| 6,694,389 B2 | 2/2004 | Coates | |
| 6,750,830 B1 | 6/2004 | Teshima | |
| 6,947,772 B2 | 9/2005 | Minear | |
| 6,989,801 B2 | 1/2006 | Bruning | |
| 7,024,415 B1 | 4/2006 | Kreiner | |
| 7,030,837 B1 * | 4/2006 | Vong et al. | 345/1.3 |
| 7,047,339 B2 | 5/2006 | Oakley | |
| 7,051,196 B2 | 5/2006 | Angelo | |
| 7,092,943 B2 | 8/2006 | Roese | |
| 7,123,212 B2 | 10/2006 | Acharya | |
| 7,136,676 B2 * | 11/2006 | Lee | 455/566 |
| 7,155,253 B2 | 12/2006 | Sawayama | |
| 7,221,331 B2 * | 5/2007 | Bear et al. | 345/1.1 |
| 7,225,410 B2 | 5/2007 | Kimmo | |
| 7,240,228 B2 * | 7/2007 | Bear et al. | 713/320 |
| 7,286,112 B2 | 10/2007 | Kinjo | |
| 7,356,570 B1 | 4/2008 | Tuli | |
| 7,356,706 B2 | 4/2008 | Scheurich | |
| 2001/0007140 A1 | 7/2001 | Landry et al. | |
| 2001/0028366 A1 * | 10/2001 | Ohki et al. | 345/772 |
| 2002/0129006 A1 | 9/2002 | Emmett | |
| 2002/0133601 A1 | 9/2002 | Kennamer | |
| 2002/0140723 A1 * | 10/2002 | Ageta et al. | 345/727 |
| 2003/0006942 A1 * | 1/2003 | Searls et al. | 345/1.1 |
| 2003/0043110 A1 | 3/2003 | Chaves | |
| 2003/0115415 A1 | 6/2003 | Want | |
| 2003/0154492 A1 * | 8/2003 | Falvo et al. | 725/113 |
| 2003/0156074 A1 | 8/2003 | Ranganathan et al. | |
| 2004/0192401 A1 * | 9/2004 | Kaida | 455/566 |
| 2004/0205536 A1 * | 10/2004 | Newman et al. | 715/509 |
| 2004/0223599 A1 * | 11/2004 | Bear et al. | 379/207.02 |
| 2004/0225901 A1 * | 11/2004 | Bear et al. | 713/300 |
| 2004/0233930 A1 | 11/2004 | Colby | |
| 2005/0005001 A1 | 1/2005 | Hara | |
| 2005/0005176 A1 * | 1/2005 | Park | 713/300 |
| 2005/0049006 A1 * | 3/2005 | Lee | 455/566 |
| 2005/0066089 A1 | 3/2005 | Karaoguz | |
| 2005/0073474 A1 | 4/2005 | Selbrede | |
| 2005/0192922 A1 * | 9/2005 | Edlund et al. | 707/1 |
| 2005/0246563 A1 * | 11/2005 | Chandley et al. | 713/320 |
| 2006/0194549 A1 * | 8/2006 | Janik et al. | 455/73 |

OTHER PUBLICATIONS

Definition of "Driver", www.searchstorage.com, Nov. 9, 2003, http://searchstorage.techtarget.com/sDefinition/0,,sid5_gci212002,00.html, Accessed Jul. 13, 2007.

Office Action dated May 8, 2008 cited in related U.S. Appl. No. 10/837,900 (Copy Attached).

Office Action dated Jul. 26, 2007 cited in related U.S. Appl. No. 10/838,174 (Copy Attached).

Office Action dated Jan. 28, 2008 cited in related U.S. Appl. No. 10/838,174 (Copy Attached).

Office Action dated Aug. 14, 2007 cited in related U.S. Appl. No. 10/837,894 (Copy Attached).

Office Action dated Dec. 27, 2007 cited in related U.S. Appl. No. 10/837,894 (Copy Attached).

Office Action dated Nov. 12, 2008 cited in U.S. Appl. No. 10/838,174 (Copy Attached).

Office Action dated Nov. 20, 2008 cited in U.S. Appl. No. 10/837,900 (Copy Attached).

Notice of Allowance dated Dec. 30, 2008 cited in U.S. Appl. No. 10/837,894 (Copy Attached).

Office Action dated Aug. 5, 2008 cited in related U.S. Appl. No. 10/837,900 (Copy Attached).

* cited by examiner

PROCESSING INFORMATION RECEIVED AT AN AUXILIARY COMPUTING DEVICE

CROSS REFERENCE TO RELATED APPLICATIONS

The present application is related to the following copending United States Patent Applications filed concurrently herewith, assigned to the assignee of the present invention, and hereby incorporated by reference in their entireties;

U.S. patent application Ser. No. 10/837,894 entitled "Context-Aware Auxiliary Display Platform and Applications;"

U.S. patent application Ser. No. 10/838,174 entitled "Auxiliary Display System Architecture;" and U.S. patent application Ser. No. 10/837,900 entitled "Caching Data for Offline Display and Navigation of Auxiliary Information."

FIELD OF THE INVENTION

The invention relates generally to computer systems, and more particularly to an improved method and system for display of information for a computing device.

BACKGROUND OF THE INVENTION

Laptops and other mobile devices allow the user to work in various locations, providing great convenience to users. However, the mobile devices are often powered down when traveling between locations, particularly with laptops in which the lid is typically closed during transit. As a result, access to relevant data on the device requires opening the laptop lid, waiting for power-up, and navigating to the desired information. This is a time-consuming and less-than-desirable user experience, particularly when the desired data is something as simple as a room number of a meeting.

U.S. patent application Ser. Nos. 10/429,930 and 10/429,932 are generally directed towards the concept of computer systems having auxiliary processing and auxiliary mechanisms, particularly display-related mechanisms, which provide some computing functionality. For example, a small LCD on the lid or side of a laptop computer can provide its owner with useful information, such as a meeting location and time.

However, such auxiliary displays have heretofore been limited to narrow, limited operations in which a dedicated auxiliary display program is customized with respect to the information that can be displayed. For example, if meeting information was desired, the user would only see the information if the auxiliary display program was programmed to display the particular type of data as well as the relevant data for the current meeting. Moreover, any displayed data was static; any change to the data required returning the computer to the powered-up state to obtain the changes.

What is needed is a way for application programs that run under the main operating system of a computer system to provide appropriate data for display on an auxiliary display of that computer system, including at times when new data becomes available and the main display is not easily accessible or accessible at all, such as when the computer system is substantially powered down.

SUMMARY OF THE INVENTION

Briefly, the present invention provides a mechanism for receiving new data at an auxiliary device associated with a main computer system and processing that new data within the auxiliary device firmware to take some action. The receipt and processing of the data is independent of whether the main computer system is in a powered-up state (online) or powered-down state (offline). For example, the auxiliary display device may present data from a cache to a user, and the new data may be used to update or augment the data in the cache. This may be done when the main computer system is online and providing other data that may be displayed on the auxiliary device, or when the main computer system is offline and only the cache is available as a subset of the source of the main computer systems' application data. In essence, the auxiliary device receives data from multiple sources, and considers the main computer system as one of those sources.

In offline operation, a cache maintains the user application data in association with structured navigational information, whereby the user can navigate among the data, e.g., to see pages of data. When the main CPU, operating system and application programs are online, they build the data cache and transfer it to a medium that can be accessed by the auxiliary device, such as auxiliary storage in the firmware.

The cache may be updated with new data that is received by the auxiliary device, without involving the main CPU, operating system and application programs. Because the data is processed in the auxiliary process, the new data is available to the auxiliary device independent of whether the main CPU, operating system and application programs are running. Thus, the new data can supplement the application program data in the online state, add to the tree of cached application program data in the offline state, and/or replace or remove something in the tree. In one implementation, the cache is arranged as a tree structure, whereby the new information could add a new branch if not related to a program that has its data cached, or update cached data if related data is already in the cache.

Sources of new data include remote data received by wireless or a wired connection to the firmware. Other examples of data sources include any of the main computer hardware such as a battery controller or network card that continues to operate while the main computer system components (CPU, operating system and the like) are offline. The received data can be processed to update the auxiliary display, or to perform other actions, such as wake the main computer system.

Other advantages will become apparent from the following detailed description when taken in conjunction with the drawings, in which:

DETAILED DESCRIPTION

Exemplary Operating Environment

Figure 1:
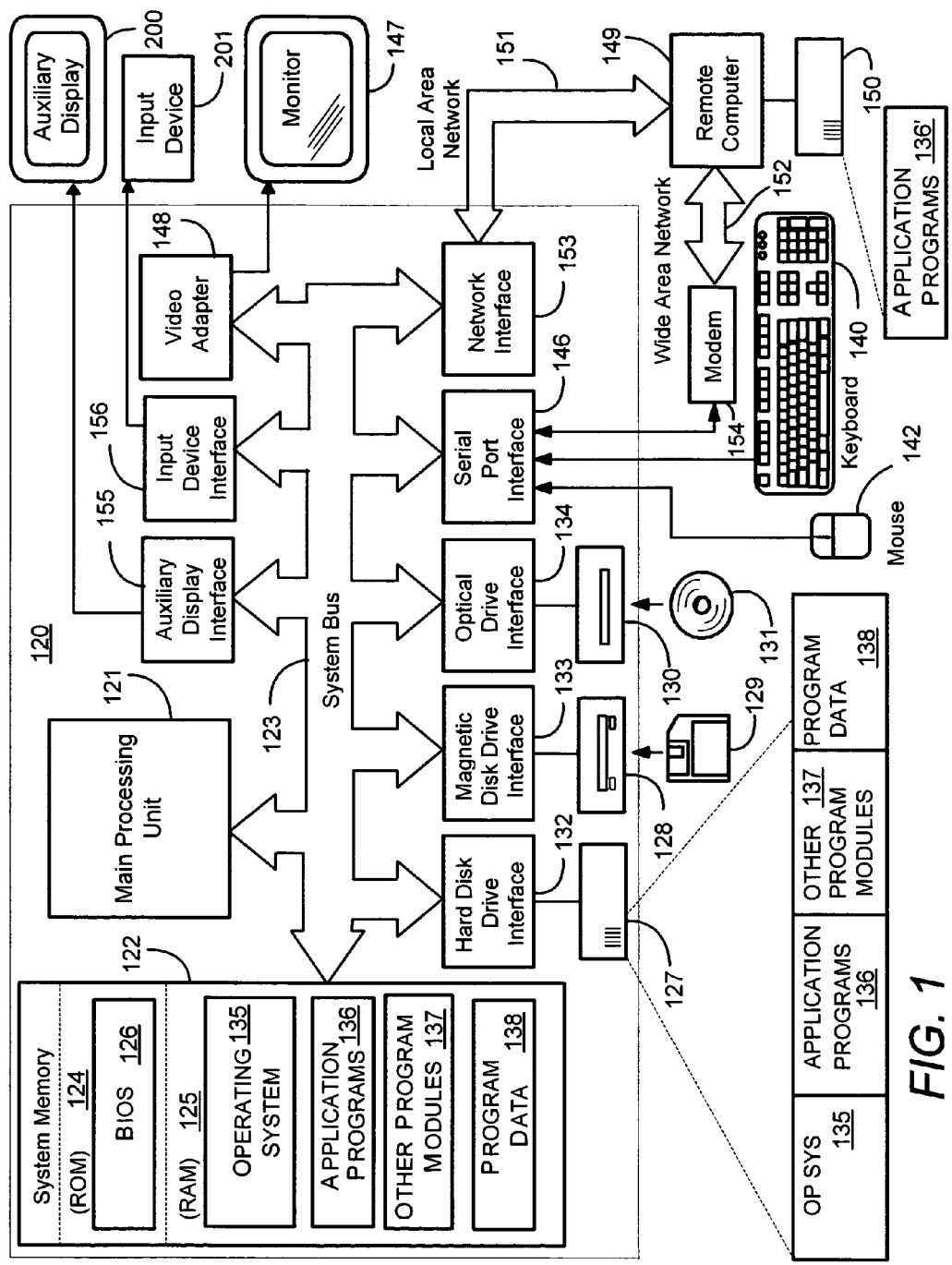
FIG. 1 is a block diagram representing a general purpose computing device in the form of a conventional personal computer system into which the present invention may be incorporated.

FIG. 1 is a block diagram representing a computing device 120 in the form of a personal computer system into which the present invention may be incorporated. Those skilled in the art will appreciate that the personal computer system 120 depicted in FIG. 1 is intended to be merely illustrative and that the present invention may be practiced with other computer system configurations, including hand-held devices, multi-processor systems, microprocessor-based or programmable consumer electronics, network PCs, minicomputers, mainframe computers, headless servers and the like. The invention may also be practiced in distributed computing environments where tasks are performed by remote processing devices that are linked through a communications network. In a distributed computing environment, program modules may be located in both local and remote memory storage devices.

The personal computer system 120 included a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124. The personal computer 120 may further include a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120. Although the exemplary computer system described herein employs a hard disk, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary computer system.

A number of program modules may be stored on the hard disk, magnetic disk 129, optical disk 131, ROM 124 or RAM 125, including an operating system 135 (such as Windows® XP), one or more application programs 136 (such as Microsoft® Outlook), other program modules 137 and program data 138. A user may enter commands and information into the personal computer 120 through input devices such as a keyboard 140 and pointing device 142. Other input devices (not shown) may include a microphone, joystick, game pad, satellite dish, scanner or the like. These and other input devices are often connected to the processing unit 121 through a serial port interface 146 that is coupled to the system bus, but may be connected by other interfaces, such as a parallel port, game port or universal serial bus (USB). A monitor 147 or other type of display device is also connected to the system bus 123 via an interface, such as a video adapter 148. In addition to the monitor 147, personal computers typically include other peripheral output devices (not shown), such as speakers and printers. An auxiliary display 200 is an additional output device, and may, for example, be connected to the system bus 123 via an auxiliary display interface 155. An auxiliary display 101 may also connect to a computing device 20 through a serial interface or by other interfaces, such as a parallel port, game port, infrared or wireless connection, universal serial bus (USB) or other peripheral device connection. An input device 201 in FIG. 1 may provide one or more actuators to interface with and/or control the auxiliary display 200, and for example may be connected to the system bus 123 via input device interface 156, which may be a serial interface, or by other interfaces, such as a parallel port, game port, infrared or wireless connection, universal serial bus (USB) or other peripheral device connection.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, Intranets and the Internet.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

It should be noted that the computer system need not be fully operational for an auxiliary display to work in accordance with the present invention. Indeed, as described below with reference to FIG. 6, an auxiliary display may still work when the computer is powered down, at least to a default extent or to an extent configured by a user, such as when the computer system is in a sleep state or a hibernate mode, and/or when the user has not yet logged on or is otherwise locked out of the system via security mechanisms. For example, the user may want a telephone handset and speakerphone that are integrated into a personal computer to work as conventional appliances when the computer system is powered down, and use the auxiliary display as a caller-ID device. This device may also store data for later transmission to the computer system when the computer system is again powered up, such as to log the calls received, including when the computer system was not fully powered up.

The auxiliary display may supplement the main display and may also serve as a surrogate display when the main display is shut down or otherwise not operational (e.g., disconnected), to give the user some information. For example, information such as how to power up the main display might be helpful, as would a room number and/or directions to a meeting on an auxiliary display device connected to a mobile computer that the user can view when the main display is off and/or not easily visible (e.g., the lid of a laptop is closed). Note that even on a tablet PC with a continually visible screen, the main display may be shut down to save power, whereby an auxiliary display may provide substantial benefits. Note that the user may limit the extent of the display based on the computer system state, e.g., when the user is not logged in, only certain non-sensitive or very specifically-controlled information may be displayed, and so forth.

To enable and control communication in these powered-down modes, firmware may exist, stored in non-volatile memory, that when loaded and operated on by a secondary processor, enables the auxiliary display, along with other auxiliary components to be used, as long as some power is available. Note that as used herein, the term "firmware" can be generally considered as representing the auxiliary memory, the code therein and/or the secondary processor on which it runs.

Figure 2A:
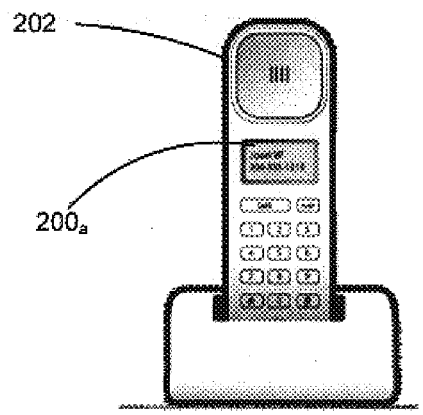
FIGS. 2A-2E are exemplary illustrations generally representing locations for placement of the auxiliary display on various devices.
Figure 2B:
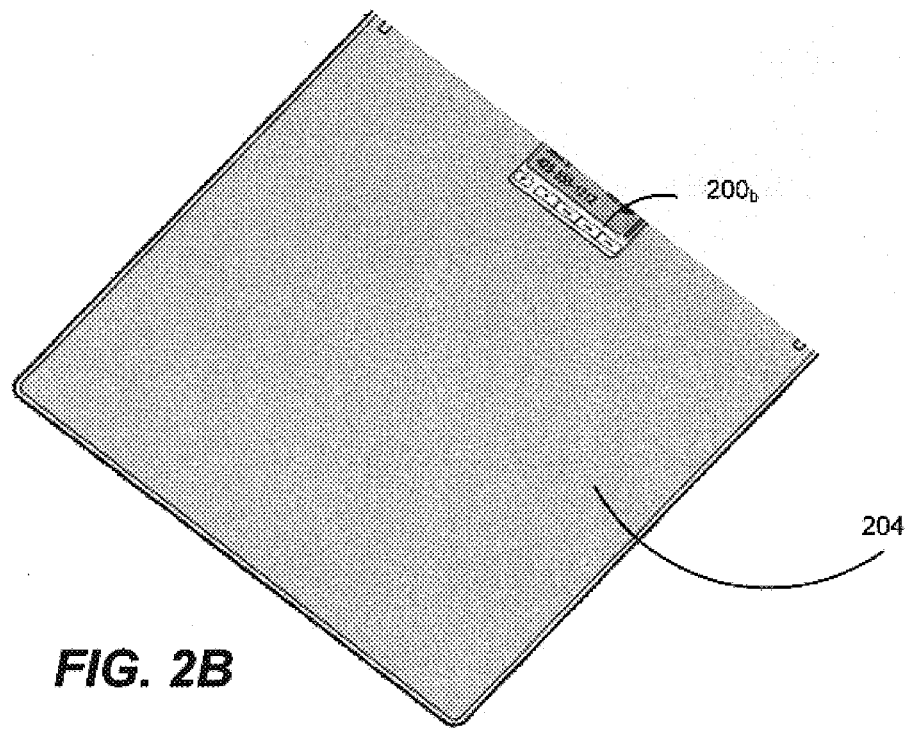
Figure 2C:
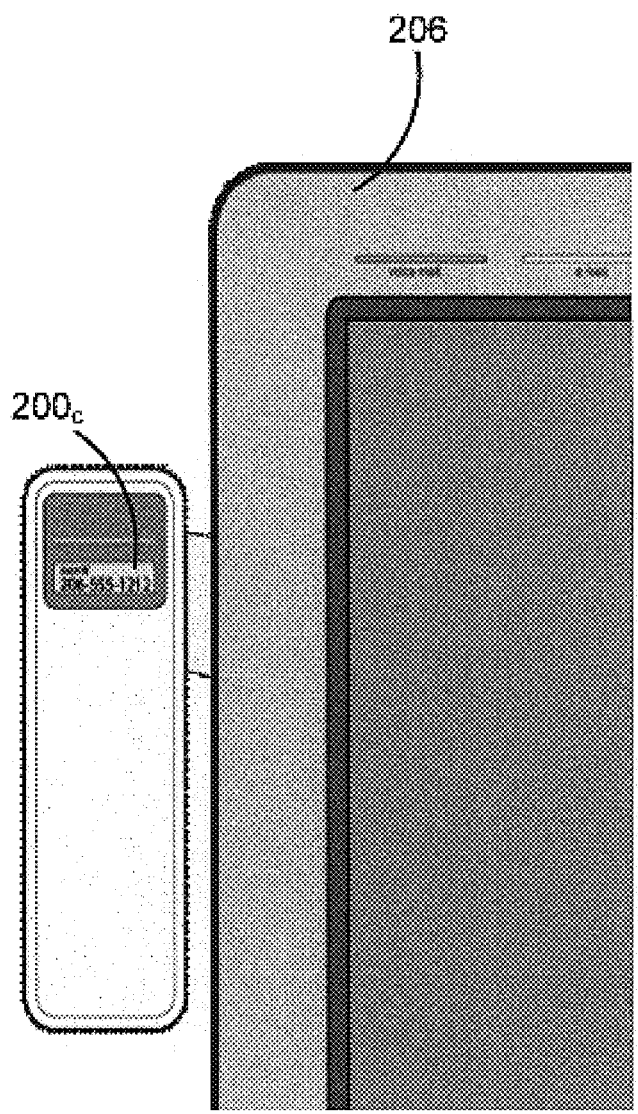
Figure 2D:
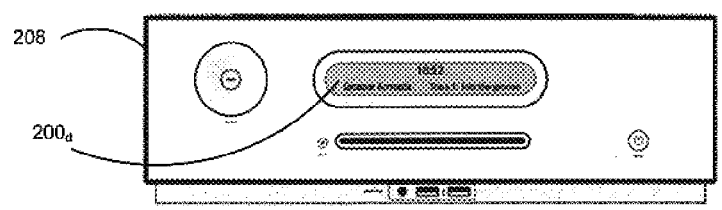
Figure 2E:
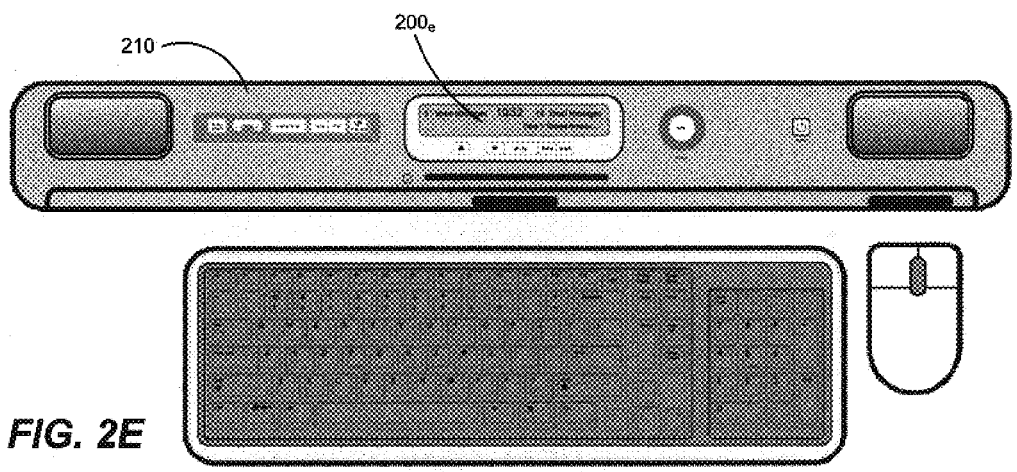

FIGS. 2A-2E illustrate exemplary locations on or associated with computing devices for placement of auxiliary display screens $200_a$-$200_e$, respectively. As represented in FIGS. 2A and 2B, an auxiliary display screen $200_a$ may be placed on the front, back or other surface of a standalone (landline or mobile) phone 202, (which need not be physically coupled if otherwise linked such as via Bluetooth technology) and/or another auxiliary display screen $200_b$ placed on the edge or lid of a mobile computer 204 or tablet computing device (not shown). Another place for an auxiliary display screen $200_c$ (FIG. 2C) may be on a phone mounted on a computer or a peripheral device attached to a computer such as on monitor 206 or on a keyboard (not shown). FIGS. 2D and 2E illustrate additional placements of auxiliary display screens $200_d$ and $200_e$ on the front panel of a standalone console 208 connected to a computer, or some other housing 210 (such as a housing for the motherboard), respectively. Those skilled in the art will appreciate that an auxiliary display screen may be placed on any surface of any computing device or other device having display capabilities, such as placed on a watch with a wireless or other connection to a computer, on a remote control device, on a remote wall-mounted unit, and so forth.

As should be apparent from FIGS. 2A-2E, an auxiliary display may be in the form of any number of known types of displays such as one or more LEDs, a 2-line alphanumeric display, a monochrome display, or a color display. Those skilled in the art will appreciate that the present invention may also use the display of other computing or communication devices as the auxiliary display 200. These other computing or communication devices include general purpose computers, cell phones, and handheld devices such as a pager or a personal digital assistant (PDA). Additionally, the present invention may use a virtual auxiliary display implemented within an area of the onscreen display of the computing device 120 (e.g. a screensaver or a component of the graphical user interface) as the auxiliary display 200, including before a user has logged in. The auxiliary display 200 may include a combination of any of the forms described above, and also be physically or logically combined with indicators such as one or more LEDs and/or used in conjunction with a virtual auxiliary display.

Even absent a screen, one or more LEDs may be advantageously used as the auxiliary display 200 for notification about the occurrence of an activity. Such an auxiliary display may be implemented with low costs and less power consumption and provide notification in an unobtrusive manner. It may be effective used for systems with extremely tight form factors or for systems where communications for users are managed by another person. An auxiliary display 200 may additionally be effective when notifications need to be seen from a distance. An auxiliary display also may be used in conjunction with an onscreen virtual auxiliary display when there is informational content associated with the activity, such as notification of a new email message. In this case, content from the email may also be displayed on the virtual auxiliary display 200. Furthermore, an auxiliary display 200 may be effectively used for public systems (libraries or kiosks) or shared computers when display of content is undesirable.

Alternatively, a 2-line alphanumeric display may be advantageously used as the auxiliary display 200 where cost or space is critical, but notifications and basic content are desired. It may be effectively used for tablet PCs, laptops, budget PCs, phone docking stations, monitor bezels, and small or low-cost PC appliances or peripherals such as a handset, keyboard, or remote control. It may also be effectively used as a replacement for (and an improvement to) a caller ID box.

Furthermore, a monochrome or color multi-line display may be advantageously used as the auxiliary display 200 for media-rich applications, high-end consumer systems or media center systems. It may be effectively used for high-end laptops with more generous form factors or where an emphasis is placed on communication, full-function PCs with a heavy business or communications emphasis, media centers or high-end media appliances (including remotes, console systems with portable media functionality) and mobile auxiliary displays. Additionally, the display of another computing or communication device may advantageously be used as the auxiliary display 200 where users can expand the role of these supplemental devices when using their PC. These other computing or communication devices include general purpose computers, cell phones, and handheld devices such as a pager or a personal digital assistant (PDA). Further, note that the auxiliary display need not be an actual display, but can be a projection (e.g., onto a wall) of the information. An auxiliary display, as referred to herein, may be composed of essentially anything that can be sensed, including any visual, audible, and/or tactile representations.

As mentioned previously, a virtual auxiliary display may be used as the auxiliary display 200 for public systems (libraries or kiosks) or shared computers when display of content is undesirable. It may also be effectively used for low-cost systems or for devices with very minimal form factors that make even LEDs impractical. A virtual auxiliary display may be implemented as a screensaver or as a component of the graphical user interface.

The input device 201, hereinafter referred to as actuators (in plural, even if only a single mechanism such as a button or pointing device), provides the user with a mechanism to switch between different categories of application data or notifications such as email notifications, voicemail notifications, calendar notifications, system status notifications, caller ID lists and other types of notification messages. Accompanying such a switch button may also be an up button and a down button to allow the user to scroll forward and backward through the notification messages within a particular category. Those skilled in the art will appreciate that any other types of actuators may be used, such as a keyboard, microphone, joystick, game pad or other device including a device that contains a biometric sensor, environmental sensor, position sensor, or other type of sensor. Any of the input devices of the computing device 120 that is represented in FIG. 1 may be used as the input device (actuators) 201, and may be used in conjunction with independent actuators.

Caching for Offline Auxiliary Display Operation

As will be understood, the present invention provides an auxiliary display 200 for a user to simply and rapidly view auxiliary information. In keeping with the present invention, the user may select, to an extent, what information appears on the auxiliary display by using actuators 201 to select among application program data that can be presented on the auxiliary device. Although program data and event notifications will be used to illustrate the auxiliary display of information, it should be understood that the present invention may provide auxiliary display of other types of information, such as data from Internet-related services including transaction services, auction services, advertising services, entertainment services, and location services. Such services can provide a wide variety of information including financial transaction information, headline or other news, stock quotes, sport scores, auction or other bidding status, weather data and other information, including information specifically requested by the user as well as unsolicited information. It will also be appreciated that the auxiliary display 201 may be operative using any number of known types of displays such as a set of notification lights, a 2-line alphanumeric display, a monochrome display, or a color display. Note that as used herein, for simplicity "auxiliary display device" will generally refer to the auxiliary display screen and/or the actuators associated with that screen as well as any other hardware, firmware or software in the device, however it should be understood that the screen and actuators may be independent mechanisms, and/or that there may not be actuators requiring physical contact to input data. Further, note that the auxiliary display device may be considered as possibly containing indicators (e.g., individual LEDs) instead of or in addition to a pixel-type display screen.

In accordance with an aspect of the present invention, the present invention facilitates usage of the auxiliary display at times when the main CPU/operating system and application programs are not operating, that is, when the system is offline, but the auxiliary device remains operational. Note that the offline auxiliary system components are implemented in firmware including an auxiliary processor and auxiliary memory containing executable code and data. To accomplish offline operation, when online the main CPU/operating system and application programs prepare a data cache and other information, that is then transferred to auxiliary storage in the firmware for use offline.

The transfer may be a full transfer of the cache at power-down (e.g., shutdown/sleep/hibernate time), or may be performed in part by a background process or the like such that only synchronization (instead of a full data transfer) is required at power-down time. Moreover, a computer device such as a desktop may not go into a powered-down state to make such a cache accessible. For example, via a background process or a manually-initiated operation, the cache can be built. If the cache is remotely accessible, the user would have remote access to the cached auxiliary information and the transfer can occur to a remote device without the computer device needing to be powered down. Thus, consider a user that travels to a meeting without a computer, but has another device such as a SmartPhone configured to remotely access the cache data of the main computer. Because of the cache, such a remote user can remotely view and navigate the cache via the remote device, which because of the cache is an auxiliary display of the system.

Figure 3:
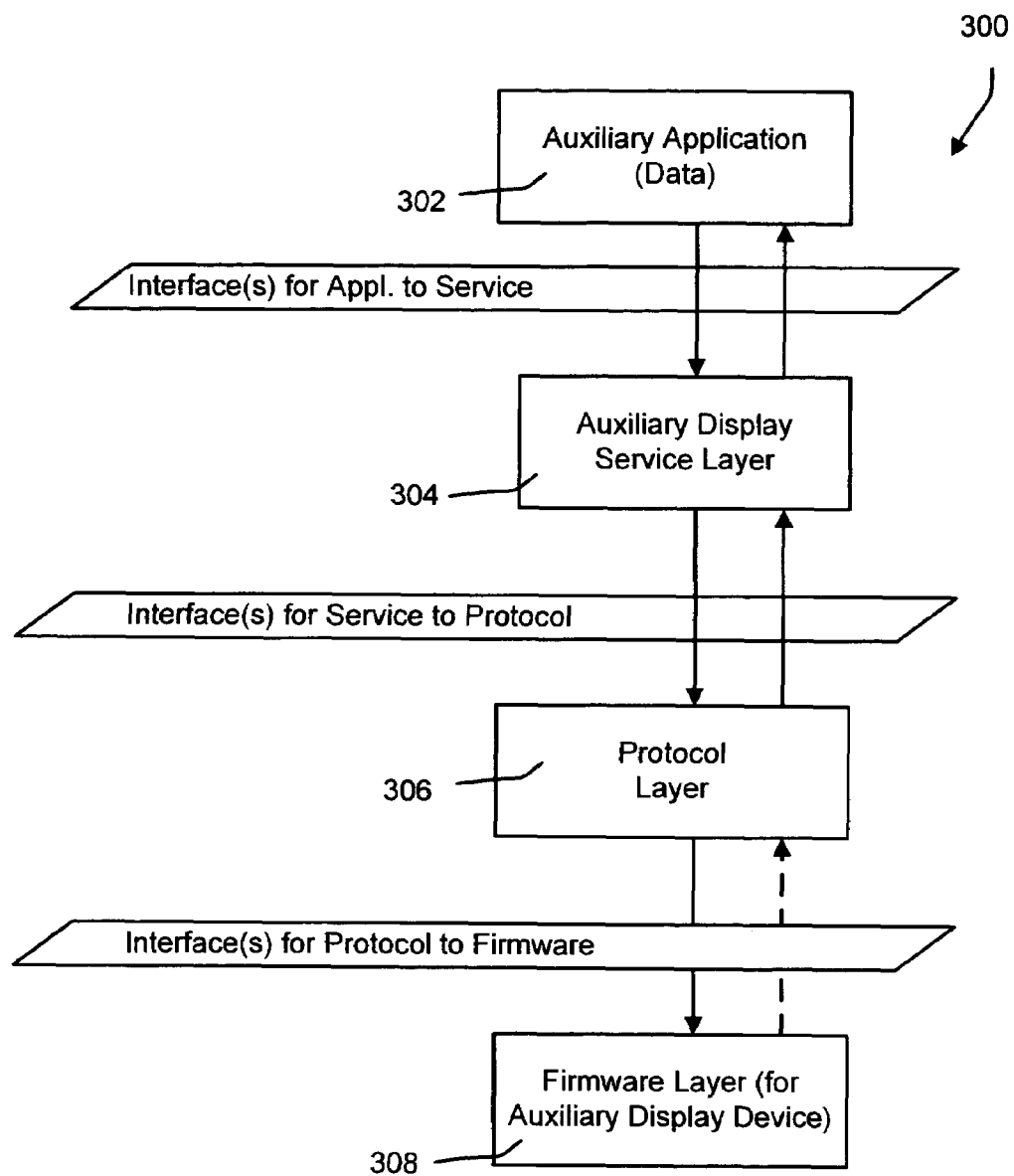
FIG. 3 is a block diagram generally representing a layered architecture by which application programs can exchange data with the firmware of an arbitrary auxiliary display device in accordance with an aspect of the present invention.

As generally represented in FIG. 3, there is provided a layered architecture by which one or more application programs 302 can interface with virtually any type of auxiliary display device, to output data to its display 200 and/or interact with the user via actuators 201. To this end, there is provided an architecture having independent architectural layers of software, as generally described in the aforementioned related U.S. patent application entitled "Auxiliary Display System Architecture." Note that in this related U.S. patent application, the layers are shown in generally the same order as in FIG. 3, although the grouping of components which is somewhat arbitrary may slightly differ from FIG. 3 of the present application. In any event, in FIG. 3, the service can be considered as an independent layer 304, with the application layer 302 above the service layer 304 and with the protocol layer 306 below the service layer 304.

In the implementation represented in FIG. 3, four layers are present, each separated by interfaces. More particularly, in addition to the application layer 302, the service layer 304, and the protocol layer 306, there is a firmware layer 308 sown in FIG. 3. As described below, these layers provide a straightforward mechanism by which an application program may provide auxiliary data for caching in a structured manner that provides a user with easy access to relevant cached information, without having to power the computer (and/or open it to see the main display screen, if a laptop or covered tablet).

Figure 4:
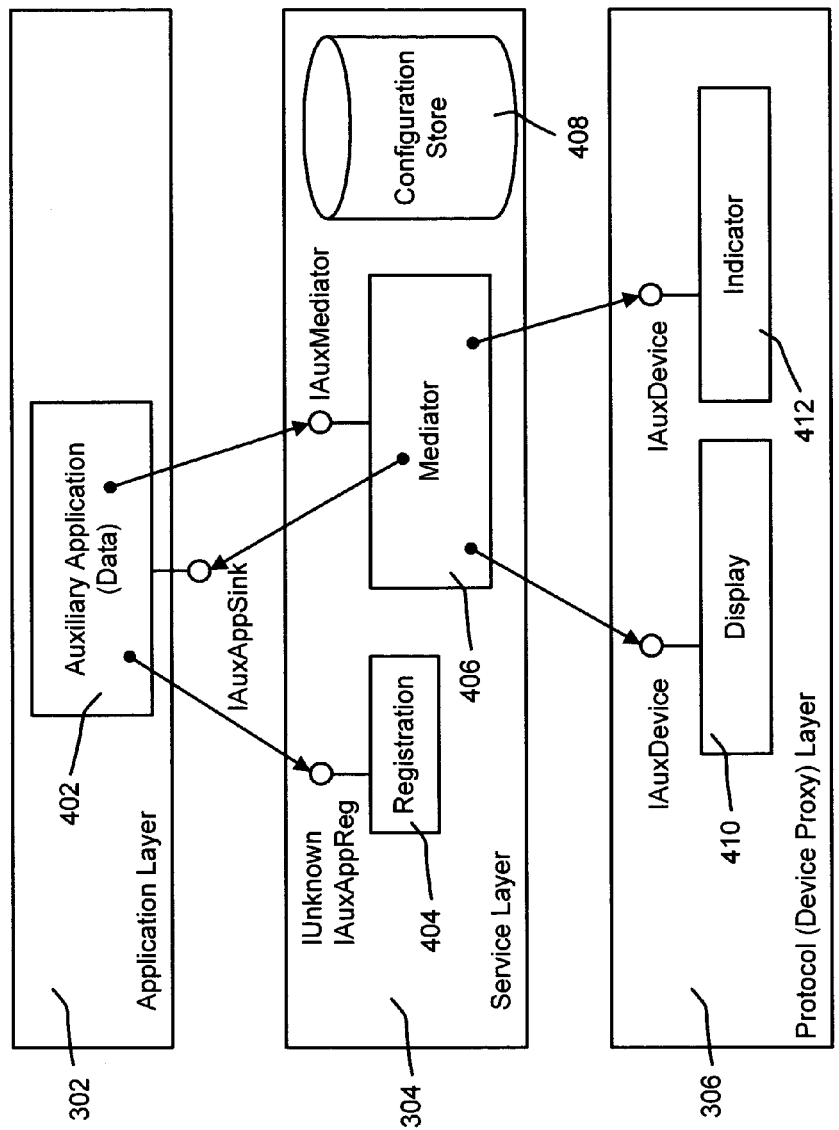
FIG. 4 is a representation of how in one implementation, an auxiliary-aware application program interfaces with the auxiliary display service to exchange data with an auxiliary display device, in accordance with an aspect of the present invention.

FIG. 4 shows some of the layers and various interfaces in more detail. In general, the application layer 302 provides the managed and native interfaces as application programming interfaces (APIs), which as described below, facilitates the creation of a structured cache, e.g., in a tree format or other suitable structure. One goal of the application layer 302 is to provide an abstraction to the details of the structured cache so that the application programs need only provide the data rather than fit it to a particular structure.

The application layer 302 provides the interfaces for developers to build solutions while the service layer addresses certain aspects of presenting auxiliary information, namely arbitration, interruption, and cache creation. Arbitration (as generally described in the aforementioned related U.S. patent application entitled "Auxiliary Display System Architecture") and interruption support provides a framework that enables sharing of auxiliary resources.

In accordance with an aspect of the present invention, cache creation is the mechanism that structures the application data for an offline experience. As described below with reference to FIG. 5, the service layer builds the cache in a manner that preserves context and structure information so that the firmware can navigate the data when completely isolated from the online operating state. As further described below, in one implementation, the service layer is also responsible for pruning the data structure in the event that its content size exceeds the allotted storage capacity of the auxiliary device firmware.

As represented in FIG. 4, the application layer 302 and the auxiliary display service layer 304 enable various structure and functionality, including auxiliary registration by which an application program 402 (or associated application plug-in) registers itself with a service registration component 404 of the auxiliary display layer 304. In the example implementation of FIG. 4, the service registration component 404 provides an IAuxAppReg interface for this purpose. Other application programs may likewise register themselves via this interface.

Once registered, the auxiliary application 402 has the ability to receive events from the associated auxiliary display device and/or related resources. For example, an event may be sent to the auxiliary application component 402 upon an auxiliary device becoming available, while another event could correspond to user interaction with the auxiliary device actuators. In the example implementation of FIG. 4, the application program implements and exposes an IAuxAppSink interface to receive such events.

The application program 402 also has the ability to enumerate the available auxiliary hardware device or devices that are available. In the example implementation of FIG. 4, a mediator component 406 in the auxiliary device service 306 provides the enumeration via an IAuxMediator interface. In this manner, the device or some data related to the device (e.g., a corresponding XML file) can report the capabilities of the device display screen or the like and/or its actuators to the application program 402. The application program 402 may then adjust the output and input according to the display, e.g., color scheme, resolution, navigation commands, and so forth can be modified for the device characteristics.

Arbitration is also provided in the mediation component 406 of the service layer via the IAuxMediator interface, to provide the mechanism that determines which application program 402 should be having its data currently displayed and should be receiving navigation commands. Note that multiple application programs take turns sharing the display as appropriate; in other words, the arbitration function of mediation manages the priority (z-order) of the auxiliary application programs and/or plug-ins.

The protocol layer 306 creates an abstraction through which the service layer 304 sends and receives data from the auxiliary device. The protocol layer 306 thus facilitates maintaining a level of hardware independence. The service layer can write to the display or set the state of indicators via an IAuxDevice interface for communicating data to the device.

Once a program is allowed to write to the display and receive commands via its actuators, auxiliary system referencing is one mechanism that provides the ability to blit/render to an abstracted memory buffer that allows the currently selected auxiliary application (e.g., plug-in) component 402 to use the display resources. In implementations that do not allow offline caching, the mediator may pass a reference pointer to the auxiliary device interface to the auxiliary application, and have the application program thereafter call the interface directly to provide display data to the display and/or indicator. This would be feasible in an offline-capable model as well, however the application would then be responsible for structuring the data, which is not quite the same level of abstraction generally desired herein. Thus, in the example implementation of FIG. 4, the application program passes its data through the service layer (the mediator interface) so that the service layer can structure the code for offline caching. Note that the same structure as that of the cache can be used when operating online, although rather then sending the cache when online, a pointer to the cache instead may be sent to the protocol/firmware layers so that the auxiliary device can obtain only the data that is needed to display at the current moment rather than receive the full set of cached data or regularly synchronize a cached copy.

As can be readily appreciated, the various layers provide auxiliary functionality in an architecture that is comprehensive and extensible. The pluggable architecture facilitates the writing of applications that can utilize the auxiliary resources without needing to understand or deal with low-level requirements.

In accordance with an aspect of the present invention, relevant application data and other information is cached for use by the auxiliary display device. A general goal is to cache the information into a quickly accessible store, along with providing a straightforward methodology for applications to provide the information to be cached. To this end, in one implementation the data is structured in a tree format (referred to as a structured cache tree), and simple primitives are provided to build the structured cache tree. In this implementation, the collection of the structured cache trees (or tree subsets), the transfer of the tree to the firmware, and the interaction by the firmware with the tree data when the main computer is powered down provides the mechanism that facilitates offline usage of an auxiliary display.

Figure 5:
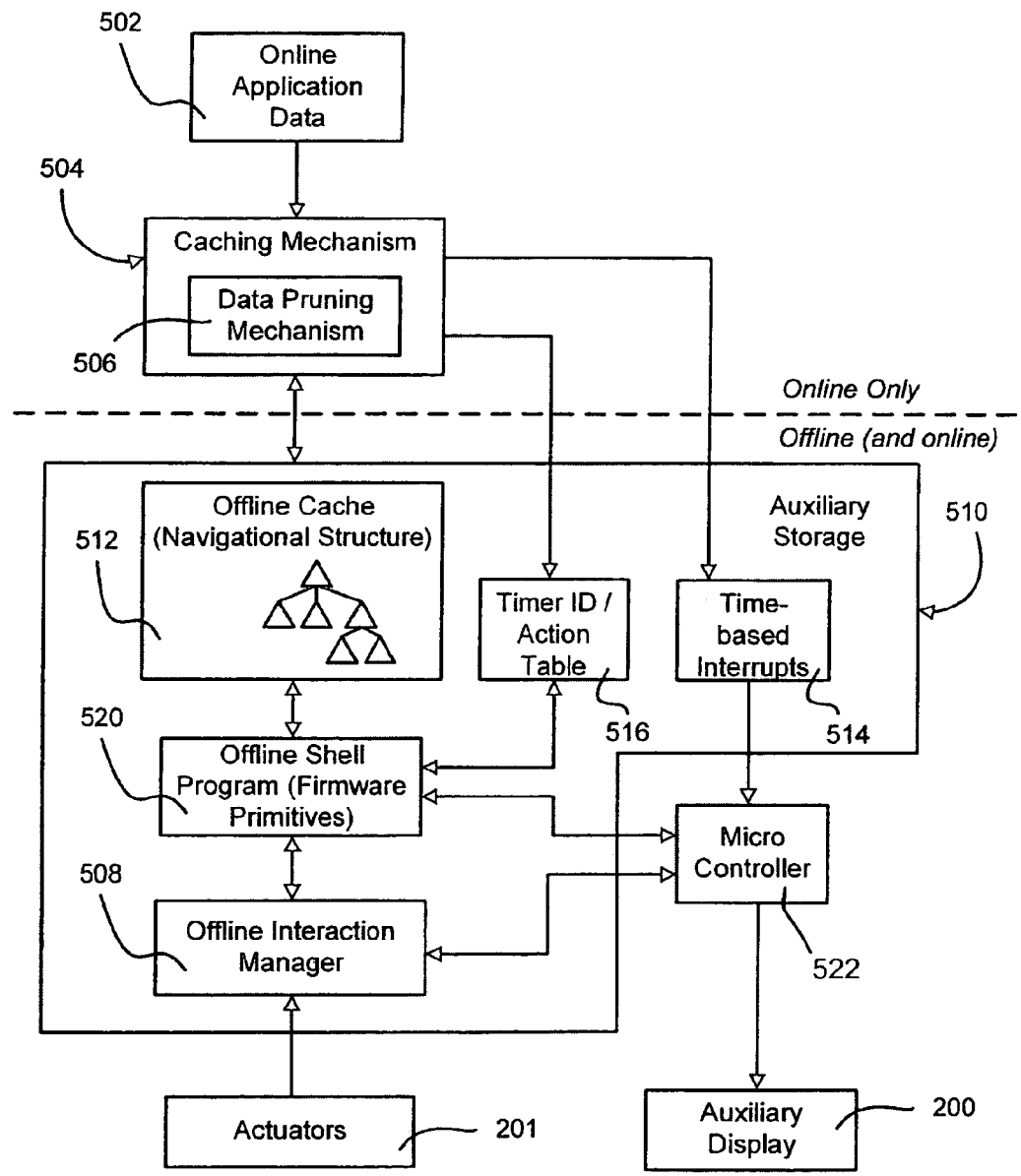
FIG. 5 is a block diagram generally representing components that provide offline navigation in accordance with an aspect of the present invention.

FIG. 5 represents a division between the online-only components and data, and the offline (firmware) components and data that can work with the online components and data when the main system is online, and also operate the auxiliary display when the main system is offline. Note that when online, the offline components and data shown in FIG. 5 are not necessarily present or active. For example, when online, an online interaction manager (not shown) handles user interaction with the actuators by sending much of the user input (e.g., navigational commands) to running application programs, whereby the offline interaction manager 508 need not be active. Also, the cache and other transferred data shown in FIG. 5 may not be transferred to the auxiliary storage 510 until transitioning from online to offline, although for speed rather than transfer all of the data, as mentioned above some of the data may be occasionally copied to auxiliary storage and synchronized at the time of online-to-offline transition time.

As represented in FIG. 5, online application data 502 is collected by a caching mechanism 504, such as by polling each application program that uses the auxiliary display for its data; (an application that is not running but for which the user has indicated a need for offline interaction with its data can be started to obtain the data). Note that every application that uses the auxiliary display device when online may not be configured to use it when offline, or may use the auxiliary device differently when offline, such as by setting offline limits when configuring the application for offline data viewing. For example, the auxiliary display can scroll through any number of messages when online, but the application may make no more than some default or user-configurable (e.g., twenty) messages available for offline scrolling.

The user may configure the system to control which application programs can provide data to the cache for offline viewing. For example, a user may want phone numbers, email messages, tasks and calendar data cached for offline viewing on the auxiliary display, but no other program's data. For example, even though an online application might use the auxiliary display for displaying stock quotes, a user might not want stock quotes cached for auxiliary viewing, because caching such data would waste storage space on data that rapidly would become obsolete.

The user may also configure the amount of storage that each application gets for its data and can configure the applications with rules for offline storage. Alternatively, an algorithm (described below) prunes data from the tree if the application programs provide too much data to cache, with any surplus from one application's allocation used for another applications' data when that other application's data uses more space than it has available. The redistribution of surplus data goes to applications based on a user-specified priority ordering, e.g., to the first application listed on the home page (the list order is user configurable), then if not all is needed to the next listed application, and so on.

As previously mentioned, the collection operation may take place when powering down, or may be ongoing to some extent with synchronization performed at the time of transitioning to offline. Pruning is performed as necessary by a data pruning mechanism 506 to divide the available storage up between applications and trim data as necessary for each to match the amount of space that is available. In any event, in the example implementation of FIG. 5, the result is a structured cache 508 of offline data that can be navigated via the tree structure.

Applications may want to provide more than just navigable data to users. For example, a calendar program may want to provide data such as a meeting reminder that automatically appears at a certain date and time. As it would be inefficient to walk the offline cache tree on a regular basis to look for such events, information such as to trigger a time based interrupt may be transferred to the firmware, as a list of times and actions to take (possibly via the tree, which would then have to be walked once to find it, but preferably as separate data). As represented in FIG. 5, the firmware may set up such time-based interrupts 514, and also store in a timer-ID to action table 516 or the like the action(s) to take when each identified timer interrupt occurs. In this manner, for example, specific reminders may be displayed at the correct moment, one or more indicators may light or flash, and so on.

Once set up and transferred and the main computer powered down, the microcontroller 522 and auxiliary storage take over sole control of the auxiliary display 200 and actuators 201. An offline shell program 520 may provide a home page from which navigation is based, along with the logic to process timer-based events and the like. The offline shell program 520 in conjunction with the offline interaction manager 508 handles navigation through the offline cache, as well as possibly changing the state of the display in response to non-manual actuators, e.g., to show a particular message when a battery is low.

Figure 6:
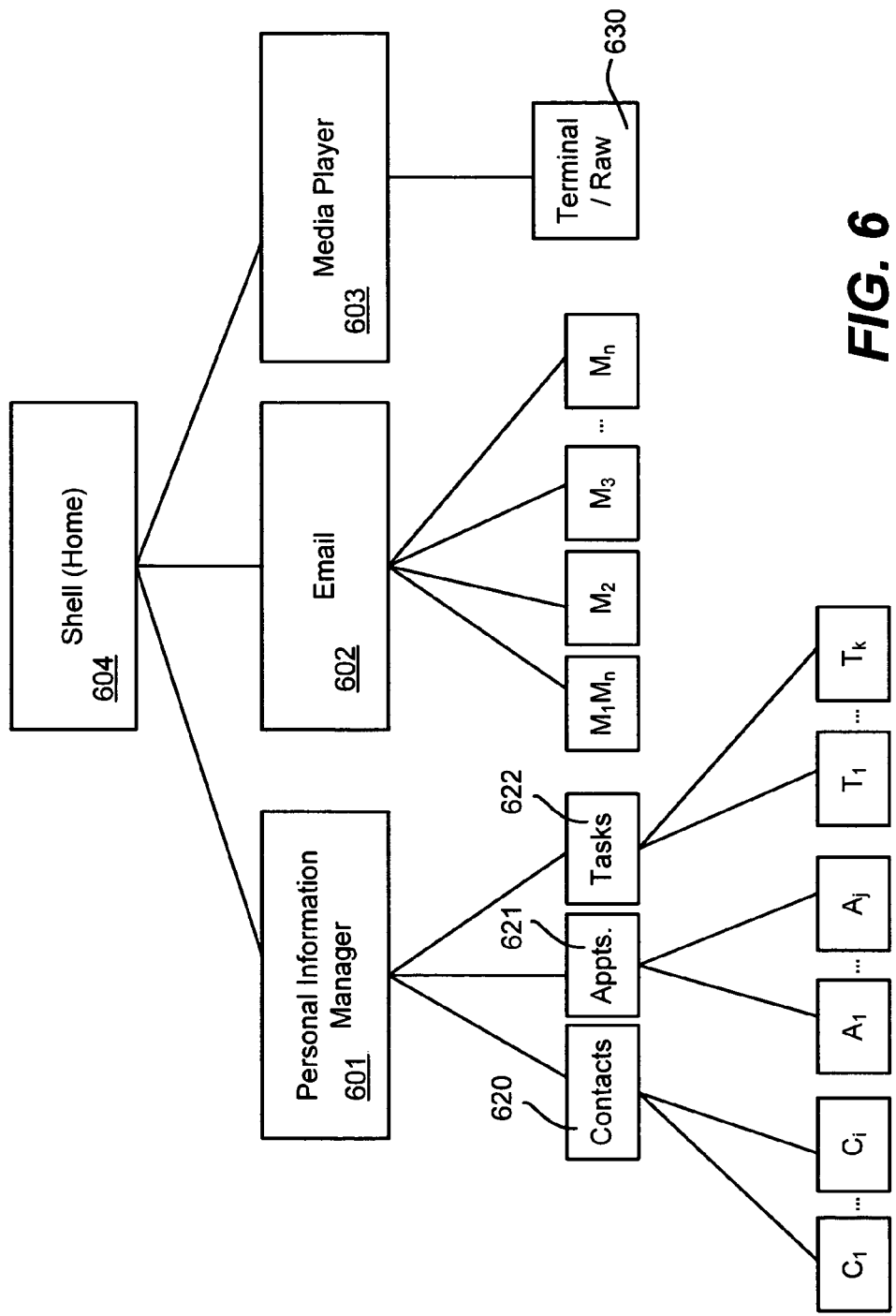
FIG. 6 is a representation of one example navigational structure, in the form of a tree for caching user data to provide offline navigation in accordance with an aspect of the present invention.

FIG. 6 shows a simple tree structure with nodes representing three application programs 601-603 under the shell (home) node 604. Although three application programs are shown any practical number (relative to the available storage space) of applications is feasible. As can be seen, because of the structure (even thought the structure itself is not typically something that would be displayed), manual navigation through the nodes is relatively intuitive and straightforward. For example, in a tree structure, only up and down navigation is needed, whereby, for example, only a two-button controller would be required, (although one or both buttons may have other functions, such as to close a timer event-driven display screen).

In general, the home page may simply provide a menu of the application programs, (scrollable if necessary) although depending on the arrangement of the actuators, a more complex menu reflecting the hierarchy is feasible, e.g., four way navigation buttons could use the up and down buttons for scrolling and the right and left buttons for expanding and collapsing the currently highlighted menu entry to show data representing any subtrees. When a user selects a page in the home page menu, such as by pressing a selection actuator button when on a page, the shell node essentially moves to that node, where the information about that page is obtained and that page is rendered. The information page may comprise anything from a bitmap to markup language (e.g., HTML or XAML) as appropriate for rendering on a given device, which depends on the code that is installed on the device. Note too that code for interpreting the cached data can be transferred or otherwise downloaded to the firmware.

As represented in FIG. 6, there may be multiple sub-levels in the tree structure. For example, the personal information manager node 620 that is shown might have contacts, appointment and task nodes (620-622, respectively) beneath it, each having its own corresponding display screen and respective sub-nodes $C_1$-$C_i$, $A_1$-$A_j$ and $T_1$-$T_k$. The application program node may only have one level below it, as represented by the message nodes $M_1$-$M_n$. In general, each node corresponds to a scrollable page that displays its data and any sub-nodes to which navigation is possible.

Note that in FIG. 6 the medial player application 603 is shown for completeness, to indicate that in some implementations, the same navigation tree may be used when online or offline for determining the next screen to render, even though the media application may not operate in the offline state. When online in such an implementation, an online-only media player application will have a display screen node in the tree to which the user can navigate, such as to view current track and timer data on the auxiliary display. When offline, the node (referred to as a terminal, or raw node) representing such a display screen may be pruned from the tree to save storage space. Alternatively, when a media player such as an MP3 player serves as the auxiliary display, such a node would allow the MP3 player to use the screen as desired, yet do so in the navigational framework with the other application data.

Figure 7:
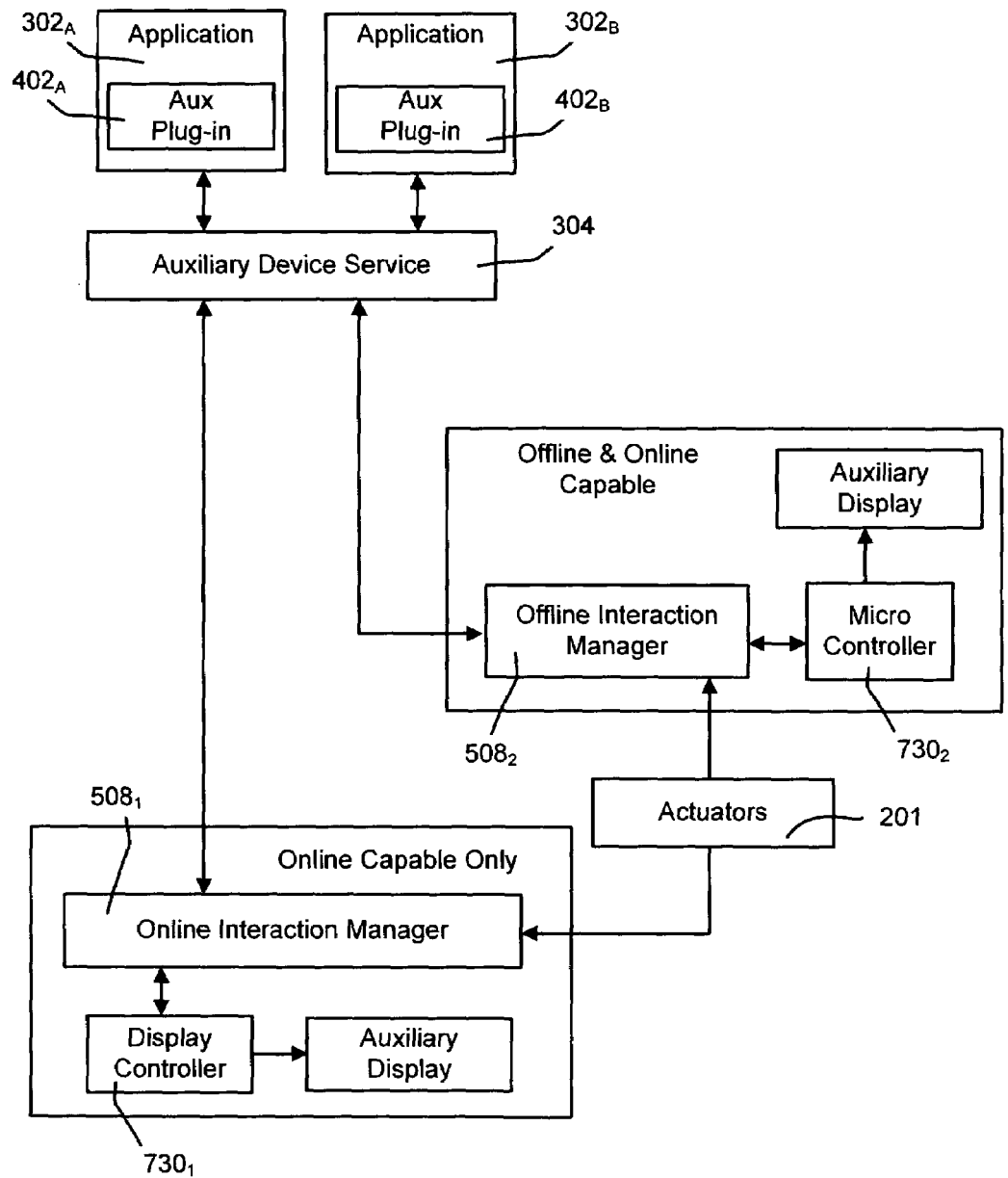
FIG. 7 is a representation of how in one implementation, an auxiliary display service can adjust to operate with different types of display devices, in accordance with an aspect of the present invention.

FIG. 7 generally represents the relationship between applications $302_A$ and $302_B$ (in this example having respective auxiliary plug-ins $402_A$ and $402_B$) and the interaction managers when in either one of these two scenarios, namely online capable only or online/offline capable. When online only, the online interaction manager $501_1$, (running in the main CPU operating system) receives user input and via the auxiliary display service 306, may pass corresponding data to the currently selected application program and/or a display controller $730_1$, for processing. Note that this is essentially as described above with respect to FIG. 5. Further, note that even though a device may be offline-capable, these online components may be run whenever the main system is online, because the processing power and memory are usually greater in the online state, and because the applications are running with actual data instead of cached data.

When offline, a different offline interaction manager $501_2$ is used. As is understood, the offline interaction manager $501_2$ runs under the auxiliary microcontroller/and offline (e.g., flash or alternatively powered) storage.

Processing Data Received at an Auxiliary Computing Device

In accordance with an aspect of the present invention, the firmware is able to receive and process additional data, independent of the online or offline state of the main computer system. From the perspective of an auxiliary device, the main computer system is only one source of the information that can be rendered by the device, and indeed, may not even be connected to the auxiliary device except by storing a cache on an independent storage medium. By using other available data sources, including data received while the main computer system is offline, the firmware running on the auxiliary display can perform actions independent of whether the main computer system is available. Such actions include updating the cached application information, supplementing the cache with new data or otherwise providing a mechanism to provide information to the user, generating an event, changing an already registered event, registering new events for firing at a later time, downloading code (including code that interprets other newly received data) and so forth. This allows the auxiliary display to have more current information, and hence display more valuable information to the user.

Consider an auxiliary display device that has hardware that is capable of receiving wireless or wired communications from some other data source, independent of whether the main computer system is online or offline. Examples of the kinds of information that may be received include email, calendaring, tasks, weather, news, battery life, and network status. Any kind of information that changes and is accessible to auxiliary device hardware is a candidate for auxiliary processing, independent of whether the main computer system is online or offline.

Figure 8:
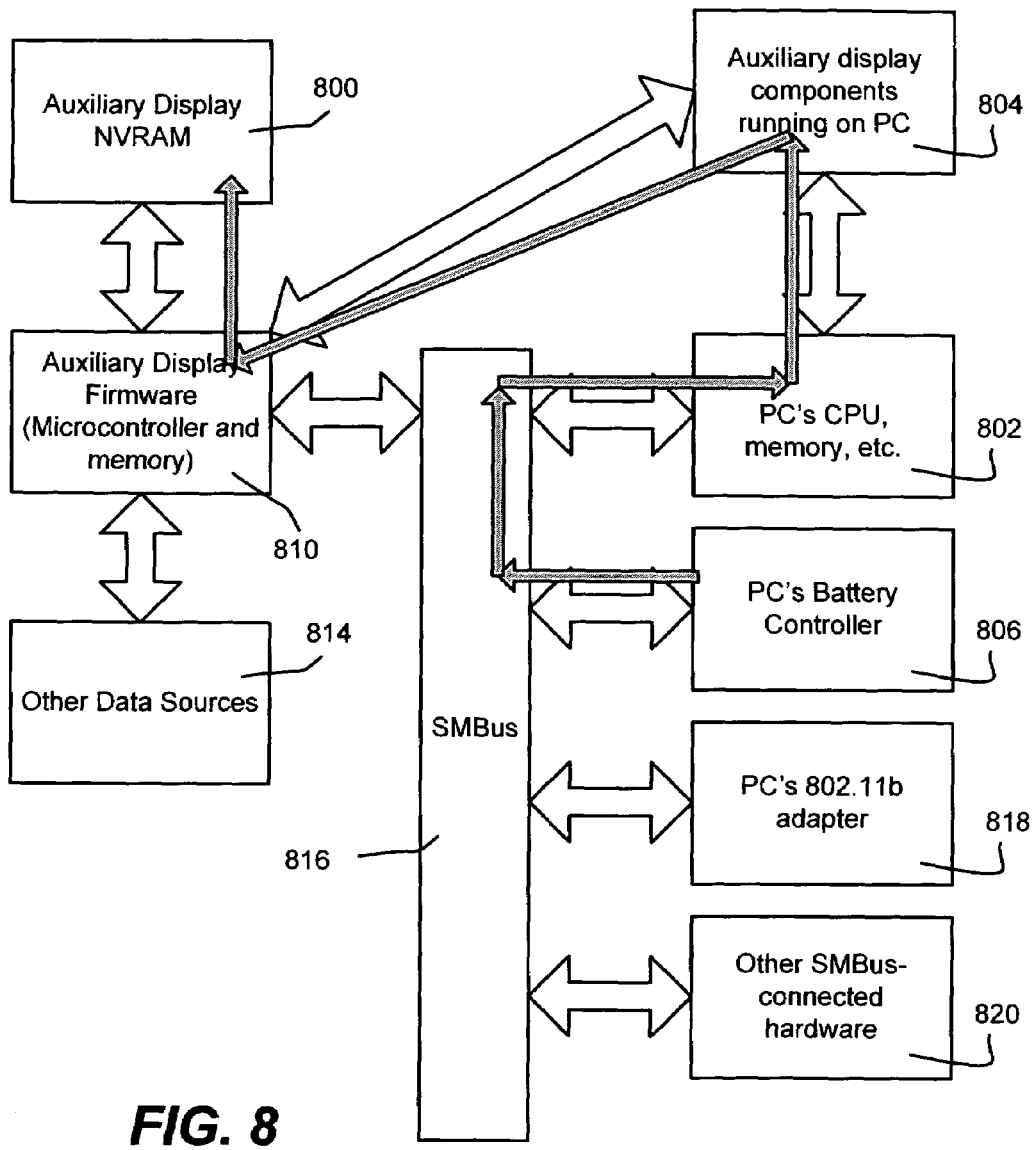
FIG. 8 is a representation of how data flows to the auxiliary device when the main computer system is in an online state, in accordance with an aspect of the present invention.
Figure 9:
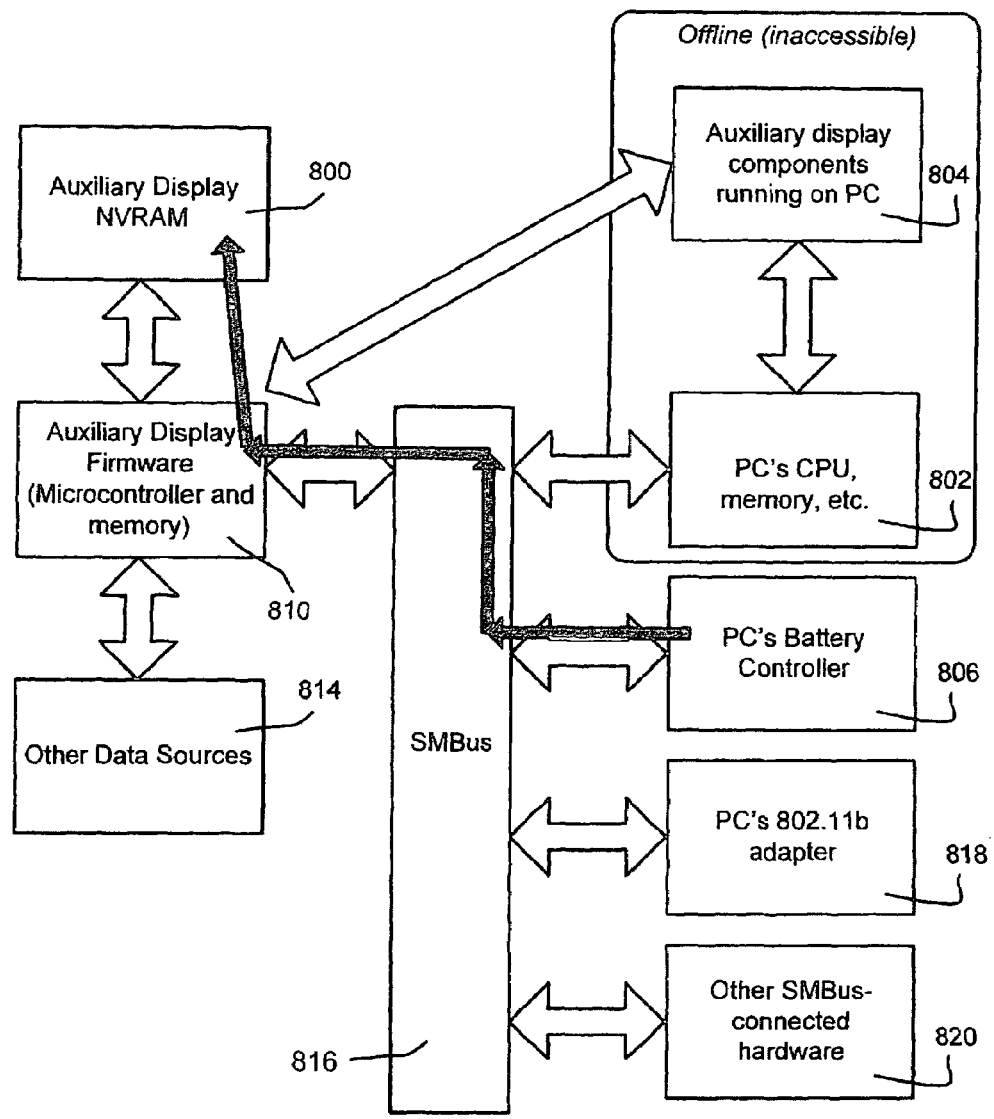
FIG. 9 is a representation of how data flows to the auxiliary device when the main computer system is in an offline state, in accordance with an aspect of the present invention.

FIGS. 8 and 9 help explain how the auxiliary device can receive the information that it presents, including information received external to the main computer system. In general, as represented in FIG. 8, when online, the main computer system components 802 (e.g., comprising the CPU and memory) is the primary source of the information presented on the auxiliary display 800, typically via the service and protocol layers as described above, represented by represented in FIG. 8 by block 804. Note that in FIG. 8 the shaded arrows indicate the primary flow of data into auxiliary display device firmware 810, using the battery controller 806 as a specific example of how data goes through the main computer system's CPU and memory 802 to reach the auxiliary display 800, such as passed in a tree structure, or on-demand in response to a request from the auxiliary device firmware 810. Note that as described below with reference to FIG. 9, because this data path is via the main computer system's CPU and memory 802 and the service and protocol layers 804, this data path is unavailable while the main computer system (that is, these components 802) is offline. Notwithstanding, as is understood, the auxiliary device firmware 810 can still present data when main computer system 802 is in an offline state.

Another source of new data may comprise existing hardware associated with the main computer system 802, such as hardware corresponding to a battery controller 806. In general, any piece of hardware accessible to the main computer system components 802 is likely capable of being a data source, as represented in FIG. 8 by blocks 818 and 820.

The source of new data may be not be coupled to the main computer system, and instead may be specifically associated with the auxiliary display hardware/firmware 810, and not used by the main computer system. For example, stock quotes received over a wireless antenna/network interface and made available to the firmware need not be forwarded to the main computer system if online (and of course cannot be forwarded if offline). For example, one such data source is a SPOT antenna connected to SPOT (Smart Personal Object Technology) radio chip that can provide information to the auxiliary firmware; if the firmware knows how to process the data, some context can be extracted therefrom in order to initiate a context-based action.

Examples of other sources that may be used to provide data for auxiliary device processing include components that can obtain data over other wireless means, e.g., wireless LAN and Bluetooth, another FM subcarrier or other radio data receiver, cellular data hardware and/or alphanumeric paging hardware. Such other data sources are represented in FIG. 8 by block 814.

Still other examples of data sources include components that can obtain data via the machine itself, such as wireless LAN radios (e.g., to provide signal strength information), battery controllers and/or Bluetooth transceivers. More general data sources comprise virtually any type of sensor based input, such as thermometers, light sensors, accelerometers, microphones, GPS receivers and so forth.

Note that one implementation of the auxiliary hardware provides the microcontroller 810 with access to the SMBus 816 of the computer system, whereby any attached hardware may be reused by the auxiliary display microcontroller and firmware 810. FIG. 9 shows how the hardware provides the microcontroller 810 with access to the SMBus 816 of the computer system, whereby any piece of hardware accessible via the SMBus 816 is likely capable of being a data source. Note that in FIG. 9, the main computer system components 802 are offline, and thus the data flow is through the SMBus 816, not through blocks 802 and 804 as in FIG. 8. Because the auxiliary firmware can access the data source directly, the main computer components 802 can be turned off and the data can still make it into the firmware, e.g., for caching.

In one implementation, as described above the information stored in the offline cache in the firmware memory is stored essentially as a tree that corresponds to displayable data, such as bitmaps, or documents (e.g., HTML or XAML) that are structured for rendering. This cache is accessed to locate the content for the display based on navigational commands or events.

In accordance with an aspect of the present invention, there is provided a mechanism by which the cache (e.g., the tree) may be modified by the auxiliary firmware, rather than being a read-only cache. To this end, if as in FIGS. 8 and 9 the auxiliary device hardware can receive data from one or more new sources and provide it to the auxiliary display firmware 810, then the firmware can process the new data to update the cache, thereby changing what the user navigation (or events) will cause to be displayed, as well as take other actions based on the context of the data. Note that new data may delete information in the cache, but if it increases the amount of data in the cache, there needs to be sufficient storage available for adding such new data, or some mechanism (e.g., offline pruning) to make additional storage available.

Further as described above, the information that changes the cache may be received from other data sources and added to the application data of the main computer system. Note that by using a tree structure or the like, such data can be merged regardless of whether the main computer system is offline (in which event the cache holds any application data) or online (in which event the cache may hold any application data or may contain reference pointers to the data in main application storage.

Figure 10:
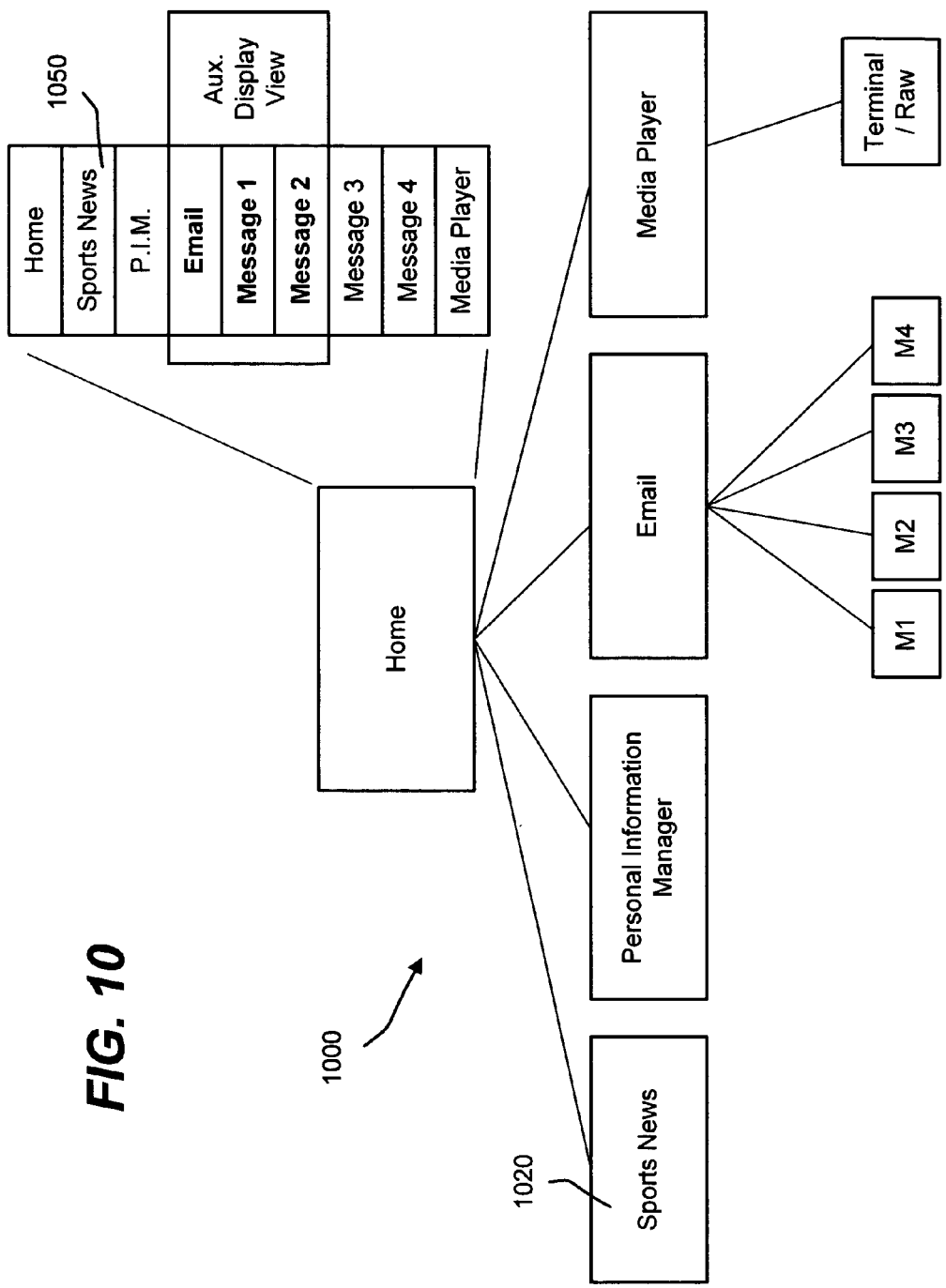
FIG. 10 is a representation of structured cache data in the form of a tree that may be updated with auxiliary data in accordance with an aspect of the present invention.

By way of example, consider the tree 1000 represented in FIG. 10. In this example, the "Sports News" branch contains data that is obtained (e.g., via a SPOT antenna connected to the firmware) without ever passing through the main processor and memory, even when the main computer system is online. When such data is received, it is added as a node 1020 to the tree 1000 (along with any children), and a "Sports News" entry 1050 is added to the home page list by the firmware. In this manner, if that entry 1050 is selected by the user from the home page, the data collected by the auxiliary device components may be displayed, just as if it came from a main computer system's running application program.

Figure 11A:
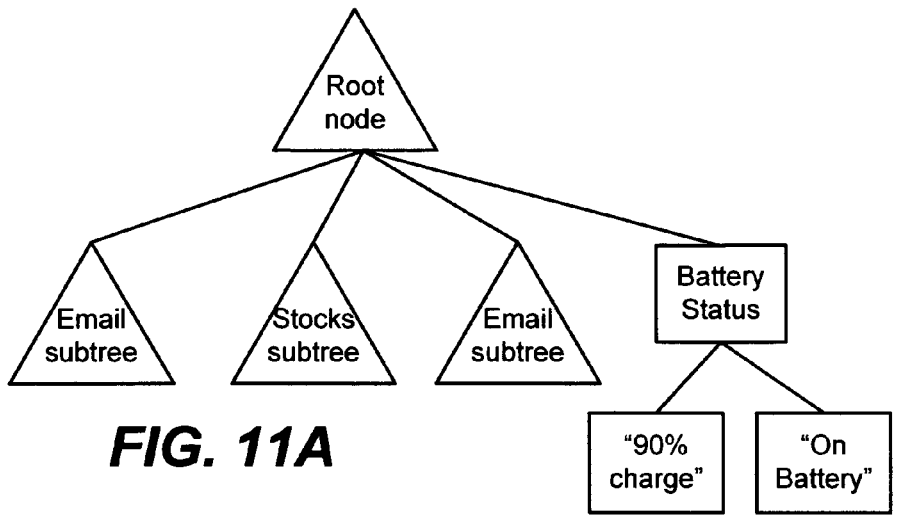
FIGS. 11A-11C are representations of structured cache data in the form of a tree that is updated with auxiliary data obtained when the main computer system is in an offline state, in accordance with an aspect of the present invention.
Figure 11B:
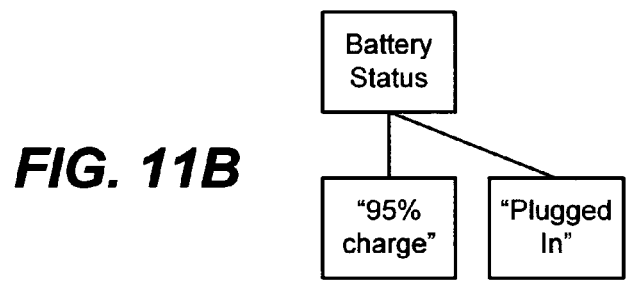
Figure 11C:
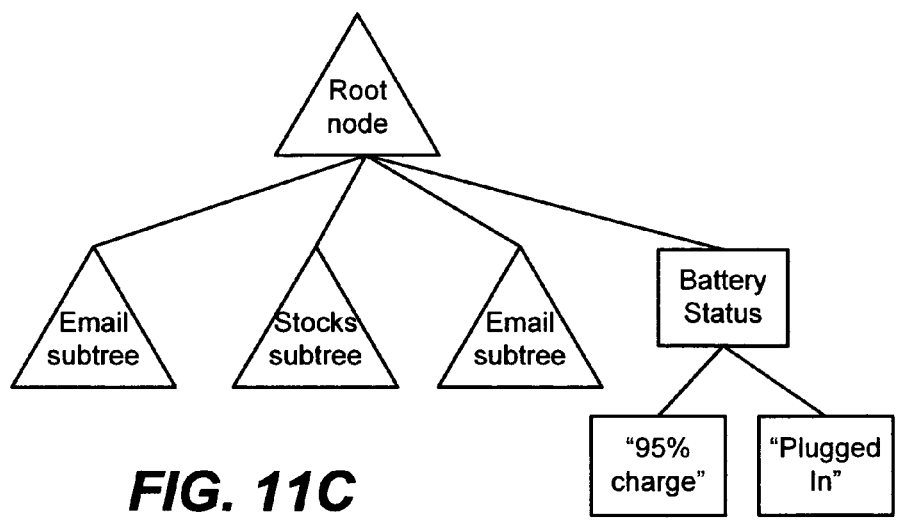

FIGS. 11A-11C show how a tree 1110 is built in another example instance. FIG. 11A shows the auxiliary display's data cache, in tree format, before receipt of new information. In FIG. 11B, the firmware communicates (e.g., calls in response to an event or navigation command) with the battery controller, and obtains data indicating that the machine is plugged in and is 95% charged. The firmware builds a branch based on that information, and in FIG. 11C, writes the new subtree into a correct position in the cache tree. The information now may be presented to the user, although it should be noted that the tree may be built in advance of any user or event-initiated request to see the new data.

In this manner, any received data, such as an email message or change to a calendar setting can be used to modify the tree (or other structure) in the cache. This may change existing data, or as in the above example, add new data to the tree, which may then be regularly updated as new data is received. This makes the information available to the user via the auxiliary display more current and thus valuable, and helps the user save time and battery life, by not requiring the main computer to be booted to obtain the new data, either to look at on the main display or merely to reconfigure the tree and send the new tree to the auxiliary display.

It should be noted that the data received can be processed to perform actions other than updating the offline navigation-related cache data. For example, SMBus or other integration may invoke other hardware components of the PC (and the related software such as the operating system) in association with external data reception. For example, a hardware notification that the wireless strength on a certain SSID is strong may be processed and recognized to wake the machine up (e.g., transition from ACPI sleep state S3 to S0), in order to ask the machine to refresh the device's data from the wireless network. Note that unlike other wake mechanisms, the auxiliary processor processes the data to determine some action based on the context of the data instead of just automatically waking the machine any time new data is detected.

As another example, a SPOT "kill signal" may be processed by the firmware to request that the operating system limit access to the main computer system, under the presumptive threat of data theft.

Note that when data is received while the main computer system is offline, it is feasible to have the auxiliary device provide access to the new data, such as to enable the main computer system to update its data when it comes back online, via an online synchronization mechanism. For example, because the new data is processed rather than simply received, it is feasible to do things such as report the type of data (e.g., email data) to the main computer system when it comes back online so that the appropriate synchronization mechanism can be invoked.

Further, again because the data is processed, when the main computer system is in a sleep state, it is possible to wake certain hardware and not others. For example, the auxiliary processor may start up the hard drive and write the new data (or some information based on the new data) to the hard drive for reading via the main operating system when it restarts.

As can be seen from the foregoing, the present invention provides a mechanism that updates the data that can be displayed on an auxiliary display, including at times when new data becomes available and the main computer system is in a powered-down (offline) state. The present invention thus provides numerous benefits and advantages needed in contemporary computing.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computing environment having a main computer system and auxiliary device firmware including an auxiliary display, the auxiliary device firmware being capable of operating that operates independently of the main computer system, a method comprising:

receiving first data at the auxiliary device firmware from the main computer system with which the auxiliary device firmware is associated, the first data being received while components of the main computer system are powered up such that a main CPU, operating system, and application programs of the main computer system are running, wherein the auxiliary device firmware comprises a secondary processor and cache that are powered up even when the components of the main computer system are powered down;

displaying the first data on the auxiliary display such that the display of the first data is primarily controlled by the main CPU of the main computer system while the components of the main computer system are powered up;

storing the first data in the cache of the auxiliary display firmware;

receiving second data at the auxiliary device firmware from a source other than the main computer system while the components of the main computer system are powered down such that the main CPU, operating system, and application programs of the main computer system are not running; and the auxiliary device firmware processing the second data in the auxiliary device firmware to modify the first data stored in the cache while the components of the main computer system are powered down; and the auxiliary device firmware displaying the modified first data on the auxiliary display while the components of the main computer system are powered down such that the display of the modified first data is controlled only by the auxiliary device firmware, wherein a battery controller of the main computer system continues to operate while the components of the main computer system are powered down, and wherein the auxiliary device firmware is connected to the main computer system via SMBus (System Management bus).

2. The method of claim 1 wherein receiving second data at the auxiliary device comprises receiving second data from hardware that is connected to the main computer system and is operating.

3. The method of claim 1 wherein receiving second data at the auxiliary device comprises receiving second data from a data source that is remote from the main computer system.

4. The method of claim 1 wherein the cache includes a tree structure, and wherein modifying the first data comprises adding a new branch to the tree structure.

5. The method of claim 1 further comprising receiving third data from a source other than the main computer system and processing the third data to wake the main computer system.

6. The method of claim 1 further comprising receiving third data from a source other than the main computer system and processing the third data to generate an event.

7. The method of claim 1 further comprising receiving third data from a source other than the main computer system and processing the third data to register an event for firing at a later time.

8. The method of claim 1 further comprising receiving third data from a source other than the main computer system and processing the third data to change a registered event.

9. The method of claim 1 further comprising receiving third data from a source other than the main computer system and processing the third data to present battery-related information on the auxiliary display.

10. The method of claim 1 further comprising receiving third data from a source other than the main computer system and processing the third data to process network-related information.

11. The method of claim 1 further comprising, providing the main computer system with access to the second data received from the other source.

12. The method of claim 1 further comprising processing the second data to maintain at least some of the second data in the cache for synchronizing with the main computer system when the main computer system is powered up.

13. A computer-readable storage medium having stored computer-executable instruction, which when executed perform a method comprising:
receiving first data at auxiliary device firmware from a main computer system with which the auxiliary device firmware is associated, the first data being received while components of the main computer system are powered up such that a main CPU, operating system, and application programs of the main computer system are running, wherein the auxiliary device firmware comprises a secondary processor and cache that are powered up even when the components of the main computer system are powered down;
displaying the first data on the auxiliary display such that the display of the first data is primarily controlled by the main computer system while the components of the main computer system are powered up;
storing the first data in the cache of the auxiliary display firmware;
receiving second data at the auxiliary device firmware from a source other than the main computer system while the components of the main computer system are powered down such that the main CPU, operating system, and application programs of the main computer system are not running;
processing, by the auxiliary device firmware, the second data in the auxiliary device firmware to modify the first data stored in the cache while the component of the main computer system are powered down; and
displaying, by the auxiliary device firmware, the modified first data on the auxiliary display while the components of the main computer system are powered down such that the display of the modified first data is controlled only by the auxiliary device firmware;
maintaining at least some of the second data in the cache for synchronizing with the main computer system when the main computer system is powered up; and
providing the at least some of the second data to the main computer system after the components of the main computer system are powered up,
wherein a battery controller of the main computer system continues to operate while the components of the main computer system are powered down, and
wherein the auxiliary device firmware is connected to the main computer system via SMBus (System Management bus).

14. In a computing environment having a main computer system, a system comprising:
an auxiliary device, the auxiliary device being associated with a main computer system and receiving first data from the main computer system while components of the main computer system are powered up, and storing the first data at a cache and displaying the first data on the auxiliary display such that the display of the first data is primarily controlled by the main computer system while the components of the main computer system are powered up such that a main CPU, operating system, and application programs of the main computer system are running, wherein the auxiliary device comprises a secondary processor and the cache that are powered up even when the components of the main computer system are powered down;
a mechanism coupled to the auxiliary device that receives second data from a data source other than the main computer system while the components of the main computer system are powered down; and
wherein the auxiliary device processes the second data received from the other source to modify the first data stored in the cache while the components of the main computer system are powered down such that the main CPU, operating system, and application programs of the main computer system are not running, and wherein the auxiliary device displays the modified first data on the auxiliary display while the components of the main computer system are powered down such that the display of the modified first data is controlled only by the auxiliary device firmware,
wherein a battery controller of the main computer system continues to operate while the components of the main computer system are powered down, and
wherein the auxiliary device is connected to the main computer system via SMBus (System Management bus).

15. The system of claim 14 wherein the other source comprises hardware that is connected to the main computer system and is operating.

16. The system of claim 14 wherein the other source is remote from the main computer system.

17. The system of claim 14 wherein the cache comprises a tree structure that the auxiliary device extends based on the second data received from the other source.

18. The system of claim 14 wherein the cache comprises a tree structure that the auxiliary device modifies based on the second data received from the other source.

19. The system of claim 14 wherein the auxiliary device receives third data from a source other than the main computer system and in response wakes the main computer system.

20. The system of claim 14 wherein the auxiliary device receives third data from a source other than the main computer system and in response registers, generates, or changes a registered event.

21. The system of claim 14 wherein the auxiliary device receives third data from a source other than the main computer system and in response presents information on a display of the auxiliary device.

22. The system of claim 14 wherein the auxiliary device receives third data from a source other than the main computer system and in response maintains at least some of the second data in storage for synchronizing with the main computer system when the main computer system is powered up.

* * * * *